United States Patent [19]

Kaminski et al.

[11] 3,720,782

[45] March 13, 1973

[54] LENSLESS FLYING-SPOT SCANNER FOR GENERATING COLOR SIGNALS

[75] Inventors: William Kaminski, West Portal; Herwig Werner Kogelnik, Fair Haven, both of N.J.

[73] Assignee: Bell Telephone Laboratories, Incorporated, Murray Hill, N.J.

[22] Filed: Dec. 20, 1971

[21] Appl. No.: 209,530

[52] U.S. Cl. .......... 178/5.4 R, 178/5.2 D

[51] Int. Cl. .......... H04n 9/04

[58] Field of Search ...178/5.2 R, 5.2 D, 5.4 R, 5.4 E, 178/5.4 ES, 5.4 ST

[56] References Cited

UNITED STATES PATENTS 3,472,948 10/1969 Hecker .......... 178/5.4 ST

*Primary Examiner*—Richard Murray
*Attorney*—R. J. Guenther et al.

[57] ABSTRACT

A color transparency is placed on the face of a flying-spot scanning cathode ray tube whose light spot is raster scanned in a conventional fashion. Three juxtaposed photomultipliers are placed a given distance in front of the cathode ray tube to collect the light transmitted by the transparency. Three primary color signals are selected by the use of appropriate color filters which cover the respective faces of the three photomultipliers. The image parallax resulting from this arrangement is compensated electrically by delay lines at the photomultiplier outputs.

7 Claims, 8 Drawing Figures

LENSLESS FLYING-SPOT SCANNER FOR GENERATING COLOR SIGNALS

BACKGROUND OF THE INVENTION

This invention relates to color television camera systems and more particularly to a lensless flying-spot scanner for generating high quality color signals.

Present day video communication systems can include a great variety of circuitry in the overall communication link between the video camera and the remote receiver. It is, moreover, well known that each of the various circuits of a communication link may have a degrading effect on the video signal being processed. In order to properly evaluate the types and extent of the degradation that may be produced, it is necessary that a highly reliable source of video signals of good quality be provided. This is particularly so when the video represents color information.

A multi-vidicon color television camera is often used as a source of "live" color signals for experiments in coding and signal processing (e.g., predictive encoding, conditional replenishment, parameter extraction), signal multiplexing and transmission techniques (e.g., delta modulation, quaternary transmission), and other related areas of interest. Maintaining a complex multi-vidicon color television camera at the acme of performance, however, requires a time consuming alignment ritual and a diligent preventive maintenance schedule.

A great number of experiments need not be conducted with a source using live scenes and can rely instead on color transparencies as still-picture material. When such material is acceptable, a flying-spot scanner (FSS) camera is, in many respects, preferable to a multi-vidicon camera. It is inherently more stable since it avoids the image and raster registration requirements of multi-tube cameras, and in addition shading correction is not required. Moreover, the photomultiplier tubes, of a FSS camera, have linear transfer characteristics and thus the necessity of matched gamma correction networks, for constructing linear luminance and color difference signals, is completely avoided.

The color flying-spot scanner camera typically used heretofore included a plurality of lenses and at least two dichroic mirrors between the scanning cathode ray tube (CRT) and the photomultiplier output tubes; see *Television Engineering Handbook*, D. G. Fink, McGraw-Hill Book Co., Inc. (1957), pages 5–45, 46. Now besides the cost of these additional intervening optical components, the lenses tend to introduce achromatic aberrations and the dichroic mirrors are angle dependent. The lenses can, of course, be precisely ground so as to reduce the aforementioned aberrations, but such precise grinding does not come cheap. The color distortions (e.g., hue and brightness) introduced by the aforementioned angle dependency can be reduced by carefully mounting the dichroic mirrors at precise angles, but the same cannot be entirely eliminated because the angle at which the incident rays strike the dichroic mirrors varies over a complete raster scan of the scanning CRT.

Accordingly, it is a primary object of the present invention to provide an improved flying-spot scanner camera that utilizes a minimal amount of optical components to achieve a reliable source of color signals of high quality.

A related object of the invention is to provide a flying-spot scanner camera of increased simplicity which produces high quality color signals.

SUMMARY OF THE INVENTION

In accordance with the invention, a color transparency is placed at the face of a flying-spot scanning cathode ray tube whose light spot is raster scanned in a conventional manner over the face of the tube. Three photomultiplier tubes are placed side by side a selected distance in front of said tube so as to collect the light transmitted by the transparency as the latter is scanned by the scanning light spot. The photomultipliers are mounted on a plane parallel to the horizontal scan lines of the raster scan. Color selection filters cover the faces of the three photomultiplier tubes so as to tune the spectral response of the latter to a desired trichromatic taking characteristic (e.g., red, green and blue). Image parallax results from this arrangement, but it is compensated for by electrical delay lines at the photomultiplier outputs. The delay of the respective delay lines is such as to achieve a time coincidence or registration between the photomultiplier output signals.

In accordance with a feature of the invention, the delay of the delay lines is selectively controlled to vary as a function of the horizontal position of the scanning light spot. This improves registration by several orders of magnitude.

BRIEF DESCRIPTION OF THE DRAWINGS

A complete understanding of the present invention and of the above and other objects and features thereof can be gained from a consideration of the following detailed description when the same is read in conjunction with the accompanying drawings in which.

DETAILED DESCRIPTION

Figure 1:
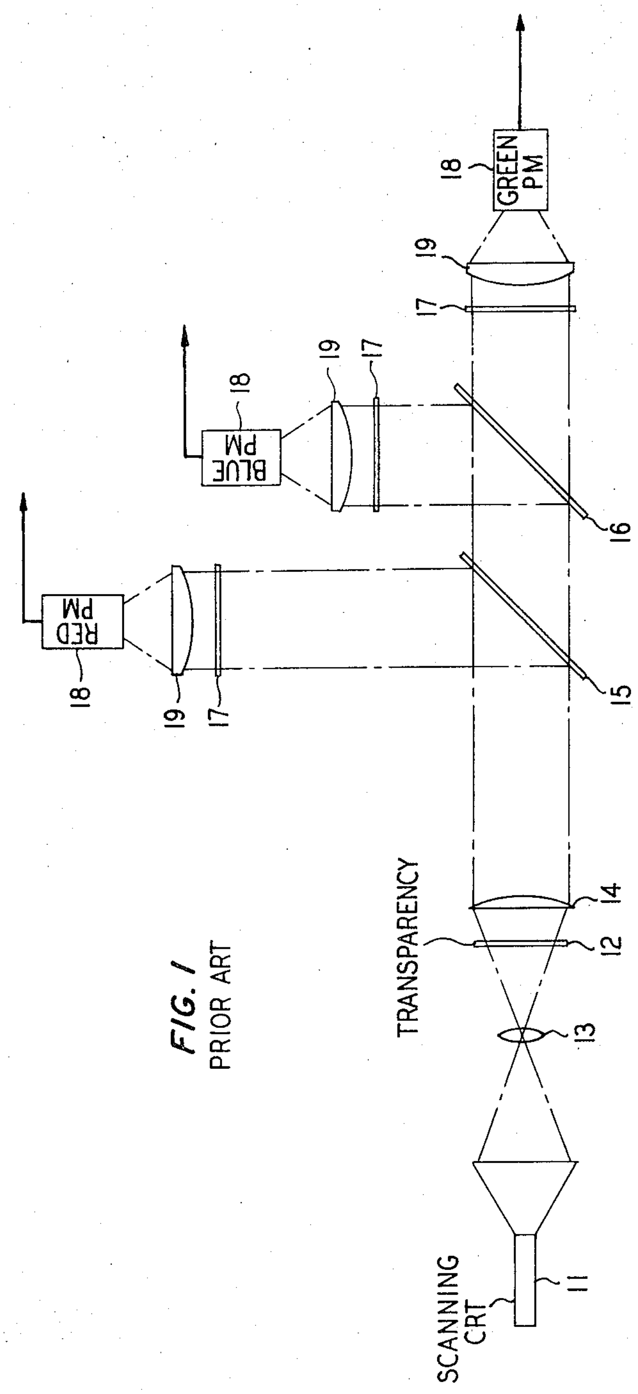
FIG. 1 PRIOR ART
FIG. 1 is a simplified schematic diagram of a prior art, flying-spot scanner color camera.

Referring now to the drawings, FIG. 1 shows, in simplified diagrammatic form, a flying-spot scanning color camera in accordance with the prior art. This prior art arrangement has been extensively described in the literature (e.g., see the Handbook by Fink, supra, and "Integrated Flying-Spot Color Slide Scanner and Television Receiver" by C. B. Neal et al. *IEEE Transactions on Broadcast and Television Receivers*, February 1970, pages 56–61) and therefore only a brief description of the same will be given here. The light emitted from the phosphor of an unmodulated CRT 11, of short persistence, is focused upon a color transparency 12 by the objective lens 13. The light, which passes through the transparency, is intercepted by the primary condensing lens 14 and is translated into approximately parallel rays. A red-reflecting dichroic mirror 15, placed in the light path, transmits most of the green and blue light while reflecting almost all red. A blue-reflecting dichroic 16, placed in the green-blue light path, transmits most of the green while reflecting almost all blue. Color correction filters 17 are mounted in front of the photomultiplier tubes 18 and they serve to tune the spectral response of the latter to an acceptable trichromatic taking characteristic. The secondary condensing lenses 19 collect the incident light passed by the respective filters 17 and direct the same to land on as much of the face area of the respective photomultipliers as possible. The red, green and blue output signals of the photomultipliers 18 are then processed in electronic circuitry in a manner such as that disclosed in the Neal et al. article, supra. As noted by Neal et al., this flying-spot color scanner is often selected for use because of ". . . its lack of registration, set-up and stability problems, and for its potential to meet picture quality and cost criteria." However, as previously noted, the lenses and dichroic mirrors of this prior art color scanner are costly and they introduce degradations into the camera system.

Figure 2:
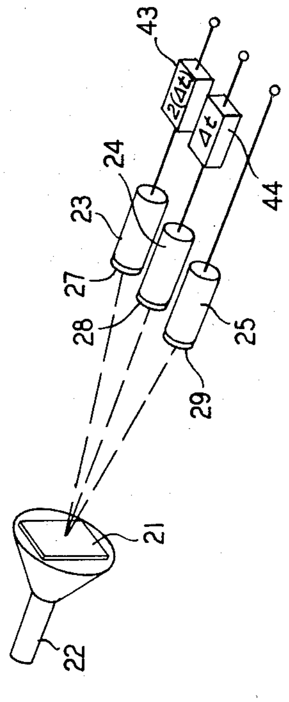
FIG. 2 is a simplified perspective diagram of a flying-spot scanner, color camera in accordance with the invention.

A lensless flying-spot scanning color camera, in accordance nce with the invention, is shown in FIG. 2. A color transparency 21 is placed at the face of the flying-spot scanning cathode ray tube 22. As with flying-spot scanning tubes in general, the electron beam of the CRT 22 is unmodulated, the light spot is swept over the face of the CRT in a conventional raster scan pattern, and the phosphor persistence time is exceedingly short. Three photomultiplier tubes (i.e., photodetectors) 23, 24 and 25 are placed side-by-side a selected distance in front of the CRT so as to collect the light transmitted by the transparency as the latter is scanned by the scanning light spot. The photomultipliers 23—25 are mounted on a plane parallel to the horizontal scan lines of the CRT raster scan. Color selection filters 27, 28 and 29 cover the faces of the three photomultiplier tubes and they serve to tune the spectral response of the latter to a desired trichromatic taking characteristic (e.g., red, green and blue). As will be evident to those in the art, the scanning CRT 22, the photomultiplier tubes 23—25 and the color filters 27—29 comprise state of the art components which can be readily purchased (e.g., the photomultipliers may be S-20 type tubes). To provide the reader with some perspective of the geometry between the recited components, a color camera arrangement constructed in accordance with the present invention comprised a CRT whose light spot was scanned in a raster measuring 8 × 8 centimeters; the distance D between the CRT 22 and the photomultiplier tubes 23—25 measured approximately 54 centimeters; and the axial separation between the photomultipliers was substantially 6 centimeters. It should be clear, however, that these measures are in no way critical and may be altered to suit the system designer (e.g., the distance D can be approximately 45 to 60 centimeters).

The optical arrangement thus far described is not practicable because the color signal outputs of the photomultipliers 23–25 are not in registration. Among other things, this lack of registration will result in a video display having multi-hued outlines and edges. Now it has been found by applicants that this lack of registration is due chiefly to the CRT glass faceplate and the fact that the index of refraction *n* of the same is different from that of the ambient air. Thus, with a transparency placed on the face of the scanning CRT 22, a given picture element of the transparency will be described by the beam sweep position at later times for each of the photomultiplier tubes. Assuming that the CRT horizontal sweep is scanning from left-to-right then that photomultiplier which is at the right will see a given picture element first and produce its electrical output signal first. And, the output signals produced by the other photomultipliers will be progressively delayed or phase shifted in time as their positions are displaced to the left. As will be described in detail hereinafter, this image parallax effect can be electrically compensated for in accordance with the invention.

Figure 3:
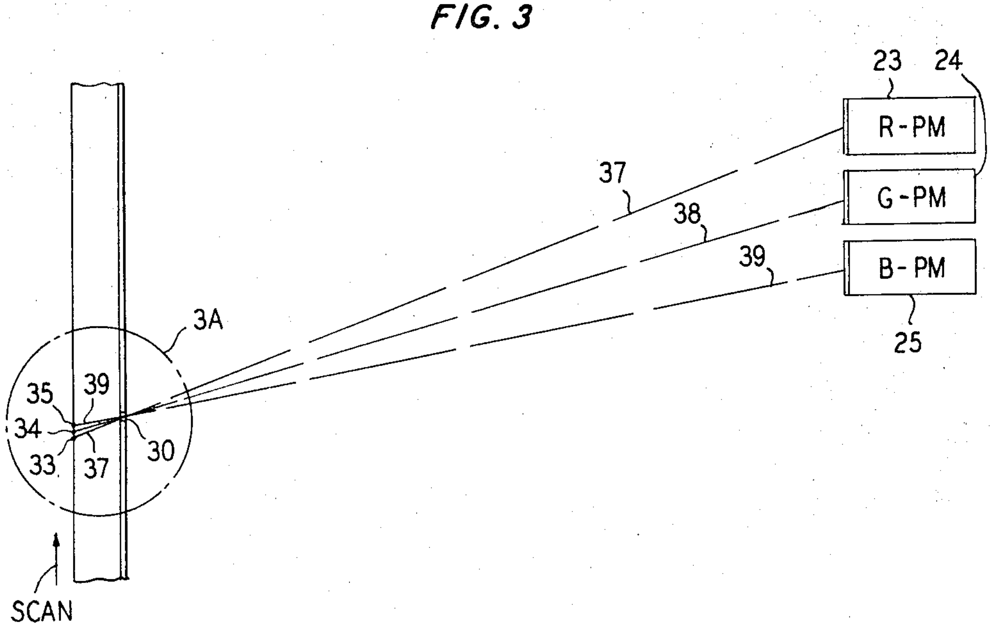
FIG. 3 is a diagram useful in illustrating the parallax problem encountered in the optical arrangement of the present invention.
Figure 3A:
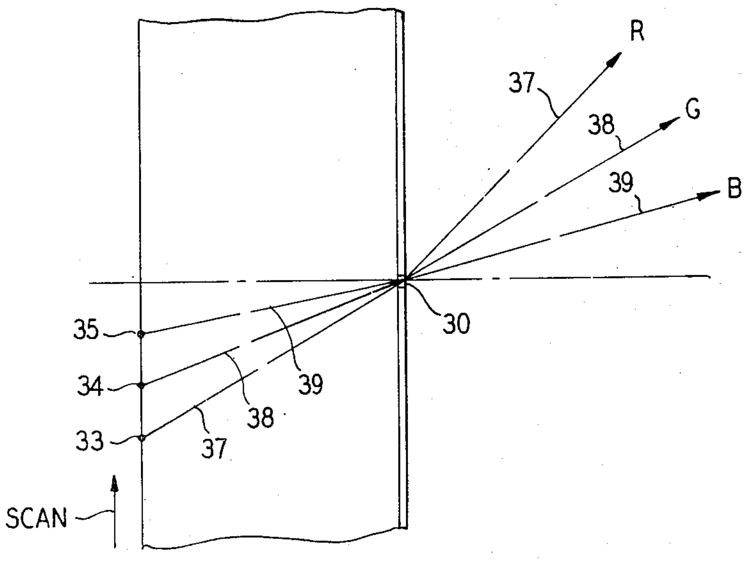
FIG. 3A shows a portion of FIG. 3 substantially enlarged and exaggerated for purposes of illustration.

The parallax problem can perhaps be better appreciated by turning to FIGS. 3 and 3A of the drawings. As indicated, a portion of FIG. 3 is shown, in FIG. 3A, greatly enlarged and somewhat exaggerated for purposes of illustration. A left-to-right horizontal sweep or scan is indicated by the arrow designated "scan." FIGS. 3 and 3A show a picture element 30 and the three positions 33, 34 and 35 of the scanning light spot necessary for the collection of light by each of the photomultipliers 23, 24 and 25. With the scanning sequence shown, the "red" photomultiplier 23 is first in producing an electrical output signal, while the output of the "blue" photomultiplier 25 is last. More specifically, the "red" photomultiplier 23 is first to see the illuminated picture element 30 when the scanning light spot is at point 33. The light path, in this case, is depicted by line 37. The light rays from spot 33 do not, of course, travel along a single well defined path, but rather they define a cone of rays. Nevertheless, the end result is the same — i.e., the photomultiplier 23 is first in producing an electrical output signal in response to the illumination of picture element 30 by the scanning light spot. With respect to the "green" photomultiplier 24, it produces an electrical output signal when the picture element 30 is illuminated by the light spot at point 34. This light path is depicted by line 38. And the "blue" photomultiplier 25 produces a corresponding output signal when the element 30 is illuminated by the scanning light spot at point 35, this light path being depicted by line 39. Accordingly, it will be apparent that the photomultiplier output signals are delayed or phase shifted with respect to one another by amounts proportional to the distances separating the beam spot locations 33, 34 and 35 on the CRT phosphor, and of course by an amount inversely proportional to the CRT beam scanning velocity. These signal delays or phase shifts can be compensated for, in accordance with the invention, by electrical delay lines at the photomultiplier outputs. As will be described hereinafter, the delay of the respective delay lines is such as to achieve a time coincidence or registration between the photomultiplier output signals.

To minimize the delay time needed to achieve registration, it is necessary that the photomultipliers 23—25 be mounted on a plane parallel to the horizontal scan lines. If this plane were orthogonal to the horizontal scan, the delay time required would have to include multiples of the line scan time. The red, green and blue primary color system is the one most often encountered in the art. However, other color systems have been proposed heretofore — such as cyan, yellow and magenta. It should thus be evident to those in the art that any color arrangement can be arrived at by simply selecting the color filters which provide the desired trichromatic taking characteristic. The left-to-right order in which the filter-photomultipliers are shown in FIGS. 2 and 3 (i.e., blue, green and red) is of little consequence and any other order will do — e.g., red, green and blue.

The delay times required for exact registration of the three photomultiplier output signals will vary as the location of the scanning spot is changed. A delay equation has been derived, however, for the paraxial case and a reasonably good first order representation of the requisite delay can be computed therefrom. The computed delay in this case will be a constant, but it has been found to provide a good first order delay correction for small angular deviations of viewing by the photomultipliers. The viewing angle can, of course, be reduced by increasing the separation between the CRT and the photomultipliers and/or by reducing the axial distance between photomultipliers.

Figure 4:
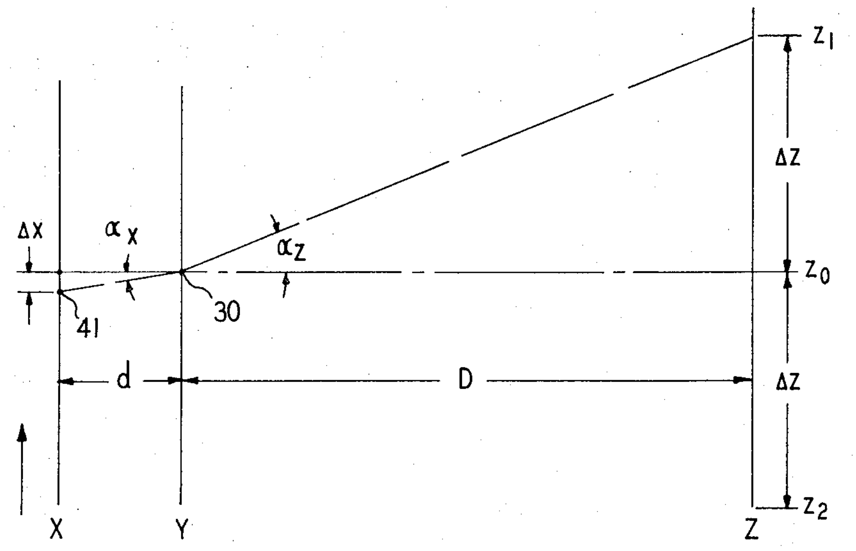
FIGS. 4 and 4A are line diagrams of the physical geometry between components of the present camera system and are of use in the mathematical analyses, infra.

Turning to FIG. 4, there is shown a diagram of the geometry between the camera components which is of use in the following derivation. The plane of the phosphor of the CRT is designated $x$ in FIG. 4, $y$ designates the plane of the color transparency (i.e., the outer face of the CRT), and $z$ designates the plane of the photomultiplier faces. The glass faceplate of the CRT has a thickness $d$, the CRT and photomultipliers are separated by a distance D, and the axes of the photomultipliers are at the designated points $z_0$, $z_1$ and $z_2$, with the photomultiplier at point $z_0$ being coaxially positioned with respect to the CRT. The angle $\alpha_x$ represents the angle a given ray makes with respect to the normal in its travel from a point 41 to the picture element point 30. This angle is primarily determined by the refractive index $n$ of the faceplate glass. The angle $\alpha_z$ represents the viewing angle from photomultiplier point $z_1$, with respect to the normal. From the figure it will be seen that $$\tan \alpha_x = \Delta x/d, \text{ and}$$

$$\tan \alpha_z\ 32\ \Delta z/D.$$

For the paraxial case, $$\alpha_x \cong \tan \alpha_x, \text{ and}$$

$$\alpha_z \cong \tan \alpha_z.$$

Now from Snell's law and for small angles $\alpha_z \cong n\alpha_x$ where $n$ equals the index of refraction of the CRT faceplate glass. Therefore, $$n\ \Delta x/d = \Delta z/D, \text{ and}$$

$$\Delta x = d/n \cdot \Delta z/D.$$

Distance equals velocity $v$ times time $t$ $$\Delta x = v \cdot \Delta t.$$

Therefore, $$\Delta t = d(\Delta z)/Dnv. \qquad (1)$$

For any given camera setup the values of $d$, $\Delta z$, $D$, $n$ and $v$ will be known or readily computed. The quantity $\Delta x$ represents the average distance between two adjacent beam spot positions on the CRT phosphor (e.g., 33 and 34, or 34 and 35, of FIG. 3). The time $\Delta t$ represents the time required for travel between these adjacent spot positions and therefore it is also the average amount of time delay needed to bring the output of a photomultiplier centered at point $z_1$ into registration with the output of a photomultiplier centered at point $z_0$. With a third photomultiplier symmetrically positioned at the point $z_2$ in FIG. 4, it will be evident that the output of the photomultiplier at point $z_0$ must be similarly delayed $\Delta t$ seconds with respect to the output of this third photomultiplier. Thus, a good first order delay correction will be achieved by delaying the output of the intermediate photomultiplier by $\Delta t$ seconds and the other photomultiplier outputs by respective amounts of $\Delta t \pm \Delta t$. Accordingly, in FIG. 2 the delay line 44 will have a fixed delay of $\Delta t$ seconds, with the delay line 43 providing a delay of $2(\Delta t)$ seconds (i.e., $\Delta t + \Delta t$). The required delay of the output signals of photomultiplier 25 is $\Delta t - \Delta t$ seconds, or zero delay. In a camera arrangement constructed in accordance with the invention, the delay value $\Delta t$ was fixed at 0.8 microseconds.

For most cases, the registration achieved by the use of fixed delay lines at the photomultiplier outputs will be acceptable. In a few instances, a more precise registration may be required. To this end, and in accordance with the invention, the signal delay times can be varied as a function of the horizontal scan time or horizontal position of the scanning light spot. The effect of vertical displacement of the scanning light spot on signal registration can be considered inconsequential and can be ignored for present purposes.

Figure 4A:
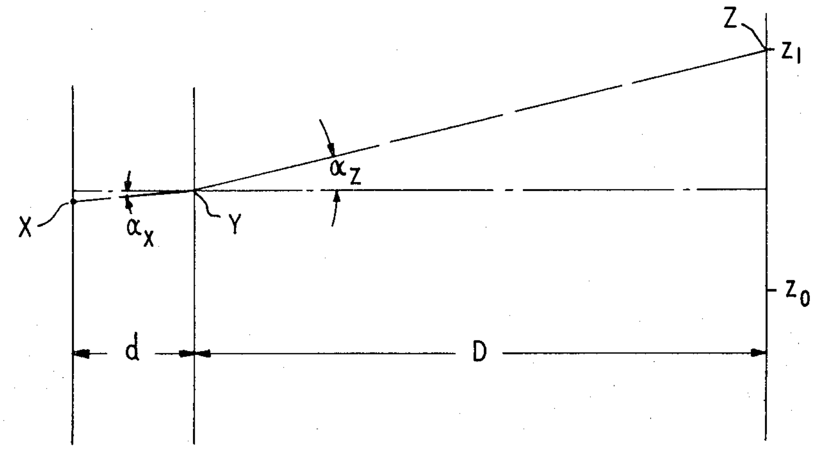

Considering now the variable delay case and referring to FIG. 4A, the angles $\alpha_x$ and $\alpha_z$ can be defined for the general case as follows:

$$\tan \alpha_x = y - x/d, \text{ and}$$

$$\tan \alpha_z = z - y/D.$$

where $x$ here represents the instantaneous position of the light spot on the CRT phosphor, $y$ represents the position of the picture element being illuminated, and $z$ represents the position of a given photomultiplier. From trigonometry and Snell's law the following relationships are known $$\tan \alpha = \sin \alpha / \cos \alpha$$

$$\cos \alpha = \sqrt{1 - \sin^2 \alpha}, \text{ and}$$

$$\sin \alpha_z = n \sin \alpha_x.$$

Therefore, $$\tan \alpha_x = y - x/d = \sin \alpha_x / \cos \alpha_x.$$

Substituting for cos $\alpha_x$ and squaring both sides of the equation we get $$\left(\frac{y-x}{d}\right)^2=\frac{1}{\frac{1}{\sin^2\alpha_x}-1}$$

and $$\frac{1}{\sin^2\alpha_x}=\left(\frac{d}{y-x}\right)^2+1. \quad (2)$$

Similarly, it can be shown that $$\left(\frac{z-y}{D}\right)^2=\frac{1}{\frac{1}{n^2\sin^2\alpha_x}-1}$$

and $$\frac{1}{\sin^2\alpha_x}=\left[\left(\frac{D}{z-y}\right)^2+1\right]n^2 \quad (3)$$

Equating Equations (2) and (3), we obtain the following exact implicit equation:

$$1+(d/y-x)^2=n^2+n^2(D/z-y)\cdot \quad (4)$$

This implicit equation relates the horizontal scan position $x$ to a picture element $y$ as seen by a photomultiplier at $z$, for each position $x$ of the scan. Since distance equals velocity times time, it will be apparent that the relative times at which a given picture element $y$ is seen at each of the photomultipliers can be derived from this implicit equation. The solution of an implicit equation is, of course, a time consuming process and can best be carried out using a general purpose digital computer.

A third order approximation of the time difference or delay between the output signals of any two adjacent photomultipliers (i.e., photomultipliers 23 and 24, or 24 and 25) can be readily derived from implicit Equation (4). The implicit equation can, of course, also be solved for even higher orders of approximation, but a third order solution would seem to be more than adequate for most purposes. A third order approximation of the aforementioned time difference is as follows:

$$\Delta t=\frac{n^2-1}{2n^3}\cdot\frac{d}{v}\cdot\frac{z^3}{D^3}-\frac{zd}{nvD}+\frac{3(n^2-1)}{2n^3}\cdot\frac{dzt}{D^3A}\left(\frac{vt}{A}-z\right) \quad (5)$$

where $A=(1+d/nD)$, and the remaining terms $d$, $D$, $n$, etc., are the same as heretofore described.

As will be evident, Equation (5) contains a constant term and a variable term, and the latter varies linearly and quadratically with time. The exact magnitude of the constant term and the range of variation of the variable term will, of course, depend on the camera system parameters. Typically, the constant term will be of an order of magnitude of approximately 0.8 microseconds, and the variable term will be measured in nanoseconds (e.g., ±6–8 nanoseconds). The third order approximation of Equation (5) is, necessarily, also indicative of the amount of delay that must be included in the photomultiplier output paths to achieve registration.

Figure 5:
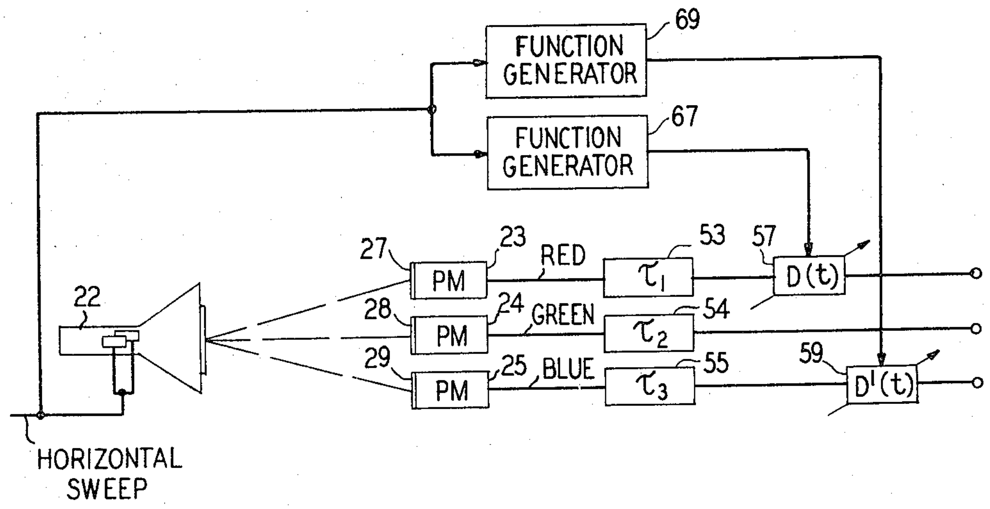
FIG. 5 is a simplified schematic diagram of an embodiment of the invention wherein the delays of the output delay lines are varied as a function of the position of the scanning light spot.
Figure 6:
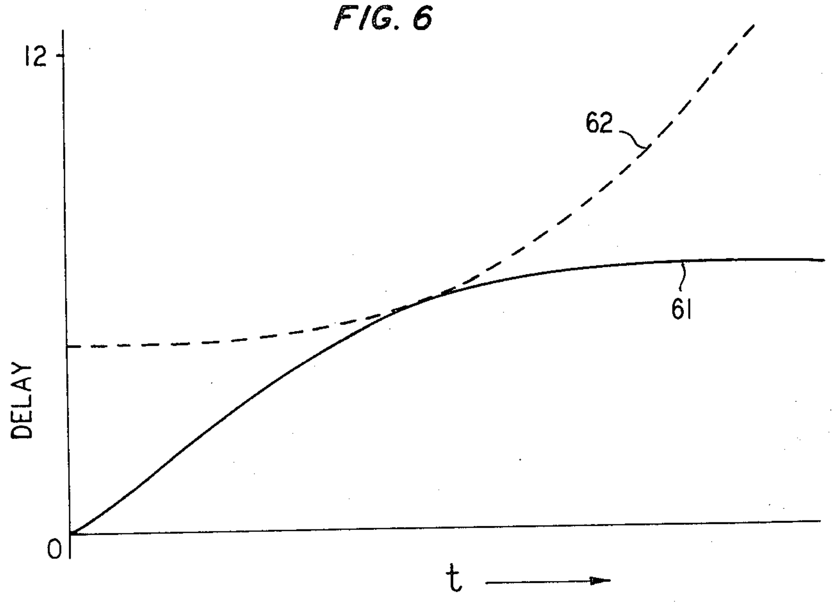
FIG. 6 shows typical curves illustrating the variable delay needed to achieve precise registration throughout a horizontal line scan.

FIG. 5 is a schematic diagram of a color camera system, in accordance with the invention, wherein the photomultiplier output signals are selectively delayed as a function of horizontal scan time. The CRT 22, photomultipliers 23–25 and color filters 27–29 are the same as shown in FIG. 2 and as described, supra. An electrical delay line 53, 54 and 55 of fixed or constant delay is respectively connected in the output path of each photomultiplier tube. The value of the delay required in each case can be derived from the implicit Equation (4) or from the third order approximation of Equation (5) and will, of course, be dependent upon the camera system parameters (e.g., $D$, $n$, $d$, $v$). As with the FIG. 2 embodiment, the values of the fixed delays $\tau_1$, $\tau_2$ and $\tau_3$ will be different, and $\tau_1 > \tau_2 > \tau_3$. In addition, the red and blue channels also include the variable delay lines 57 and 59, respectively, whose delays D($t$) and D'($t$) vary as a function of horizontal scan time. The delay variation required in each case to achieve signal registration can be determined from the implicit Equation (4) for a color camera of known parameters. The curves of FIG. 6 illustrate typical delay variations as a function of horizontal scan time $t$. Curve 61 shows the required delay variation for the red channel and curve 62 shows the same for the blue channel.

A pair of function generators, shown schematically at 67 and 69 in FIG. 5, are used to achieve the required delay variations. Since the CRT horizontal sweep signal defines the horizontal spot position as well as horizontal scan time, the same is delivered to the input of function generators 67 and 69. The function generator 67 produces an analogue output signal that closely matches the curve 61 of FIG. 6, while the analogue output signal of function generator 69 matches curve 62. These analogue output signals are produced for each and every input sweep signal. As with function generators in general, the desired curves are matched by the function generators 67 and 69 using a piecewise, linear-segment approach. The accuracy of the match is determined by the number of linear line segments used, and the same can vary from two to 10 or more line segments. The invention is not dependent upon or restricted in any fashion to any particular type of function generator and, as will be apparent to those in the art, the only limitation on these generator circuits is that dictated by the output function (or curve) desired. It is common practice in the analog computer art to use simple resistors, diodes, etc., as input and/or feedback elements in operational amplifier circuits to arrive at complex transfer functions; see *Analog Methods in Computation and Simulation* by Soroka, McGraw-Hill Book Co., Inc. (1954), pp. 203–207; and *Electronic Analog Computers* by Korn and Korn, McGraw-Hill Book Co., Inc. (1956), pp. 290–299. Tapped potentiometer circuits are also often used to generate arbitrary or complex functions (see pages 321—329 of Korn and Korn) but the operational amplifier approach is preferred here.

The analogue output signals of the function generators 67 and 69 are respectively coupled to the delay lines 57 and 59 for the purpose of varying the delay therein in a manner such as that typified by the curves of FIG. 6. The delay variations required here are slight (6–8 nonoseconds), while the period over which these variations take place (i.e., a horizontal scan time) is relatively long — e. g., 100 microseconds. Accordingly, the variable delay devices 57 and 59 need not be of a sophisticated design, and a number of prior art electrical delay lines of variable duration are known which can be advantageously utilized herein. With the photomultiplier output signals thus delayed as a function of the horizontal scan time (or horizontal spot position) a more precise registration between said output signals will be achieved.

The prior art flying-spot color camera of FIG. 1 has been proposed for use in video tape, home color television systems (see the Neal et al article, supra) and for televising color motion-picture film (see the Handbook by Fink, supra). It must be made clear therefore that the flying-spot scanning color camera of the invention can be used equally for these purposes and for any other purpose for which the prior art color camera is deemed suitable.

It is to be understood that the foregoing description is merely illustrative of the principles of the present invention and various modifications thereof may be devised by those skilled in the art without departing from the spirit and scope of the invention.

What is claimed is:

1. In a color camera system, a flying-spot scanner including a cathode ray tube whose light spot is raster scanned over the face of the tube, a color transparency positioned at the face of said tube, three photodetectors positioned side by side a selected distance in front of said tube to collect the light transmitted by the transparency as the same is scanned by the scanning light spot, said photodetectors being mounted on a plane parallel to the horizontal scan lines of said raster scan, three color selection filters respectively covering the faces of the photodetectors and serving to tune the spectral response of the latter to a desired trichromatic taking characteristic, and delay means connected to the output of each photodetector for delaying the photodetector output signals by selected amounts to achieve a time coincidence therebetween.

2. A color camera system as defined in claim 1 wherein said delay means comprises a delay line of fixed delay in each photodetector output path, the delay line in the path of the intermediately positioned photodetector providing a delay of $\Delta t$ seconds, and the delay lines in the paths of the other photodetectors providing respective delays of $\Delta t \pm \Delta t$ seconds.

3. A color camera system in accordance with claim 2 wherein the delay value $\Delta t$ is given by the equation $$\Delta t = d(\Delta z)/Dnv$$

where $d$ is the thickness of the glass faceplate of the cathode ray tube, $\Delta z$ is the separation between adjacent photodetectors, $D$ is distance separating the cathode ray tube and the photodetectors, $n$ is the index of refraction of the faceplate glass, and $v$ is the horizontal spot scan velocity.

4. A color camera system as defined in claim 3 wherein the trichromatic taking characteristic comprises the primary colors of red, green and blue.

5. A color camera system as defined in claim 1 wherein said delay means comprises a delay line of variable delay in the output paths of at least two of said photodetectors, said delay being varied in each case as a function of the horizontal scan time of the scanning spot.

6. A color camera system as defined in claim 5 wherein the relative delays provided between the output signals of adjacent photomultipliers are exactly determined by the implicit equation $$1 + (d/y-x)^2 = n^2 + n^2\,(D/z-y)^2$$

where $x$ represents the instantaneous position of the scanning light spot, $y$ represents the position of a picture element under illumination, $z$ represents the position of a given photomultiplier, $d$ is the thickness of the glass faceplate of the cathode ray tube, $n$ is the index of refraction of the faceplate glass, and $D$ is the distance separating the cathode ray tube and the photodetectors.

7. A color camera system as defined in claim 6 wherein the trichromatic taking characteristic comprises the primary colors of red, green and blue.

* * * * *